Aug. 26, 1969  J. HRDINA  3,463,179
APPARATUS FOR FEEDING AND MEASURING A SUBSTANTIALLY EVENLY
SEGMENTIZED FLUIDAL MEDIUM
Filed Dec. 7, 1966  3 Sheets-Sheet 3

INVENTOR.
(Dr.Ing.) JIŘI HRDINA
BY
Attorney

United States Patent Office
3,463,179
Patented Aug. 26, 1969

3,463,179
APPARATUS FOR FEEDING AND MEASURING A SUBSTANTIALLY EVENLY SEGMENTIZED FLUIDAL MEDIUM
Jiří Hrdina, Prague, Czechoslovakia, assignor to Československa akademie ved, Prague, Czechoslovakia, a corporation of Czechoslovakia
Filed Dec. 7, 1966, Ser. No. 599,972
Claims priority, application Czechoslovakia, Dec. 10, 1965, 7,436/65
Int. Cl. G01f 3/04
U.S. Cl. 137—154       7 Claims

ABSTRACT OF THE DISCLOSURE

A tubing causes a fluid substantially evenly divided into segments by bubbles of a liquid not mixable therewith to flow into and through a measuring cell to place a fluid segment therein for measurement. The said flow of fluid contains a volumetrically changeable portion such as a resilient portion and passes through a sensing device testing the position of one bubble therein relative to a segment of fluid to be measured in the cell. In case of a disagreement between these positions the sensing device actuates pumping means which changes the volume of said changeable portion of the flow of liquid thus controlling this flow of liquid through the tubing and placing a fluidal segment in agreeing position into the cell for measurement.

My invention relates to means for measuring liquid media flowing through a feed tubing of a laboratory apparatus for example a photometric measuring cell.

It is known to divide the flow of a liquid moved by pumping means through a narrow feed tubing towards a photometric measuring cell into subsequent substantially equal sections by separating drops or bubbles, generally referred to as pistons, of a fluidal medium which does not mix with the liquid and to regulate the said flow of liquid by conventional sensing means influencing the working capacity of the pumping means and thus the velocity of the flow in the feed tubing.

According to my invention I regulate the sectionalized flow of the liquid by changing in a controlled manner derived from proper sensing means the volume of a portion of the feed tubing, or possibly the volume of spaces connected therewith, so that the position of each section of the flow of liquid while within the measuring cell is properly determined. In changing the said volume it is increased when the flow of liquid is to be retarded and decreased when the flow of liquid is to be accelerated.

Figure 1:
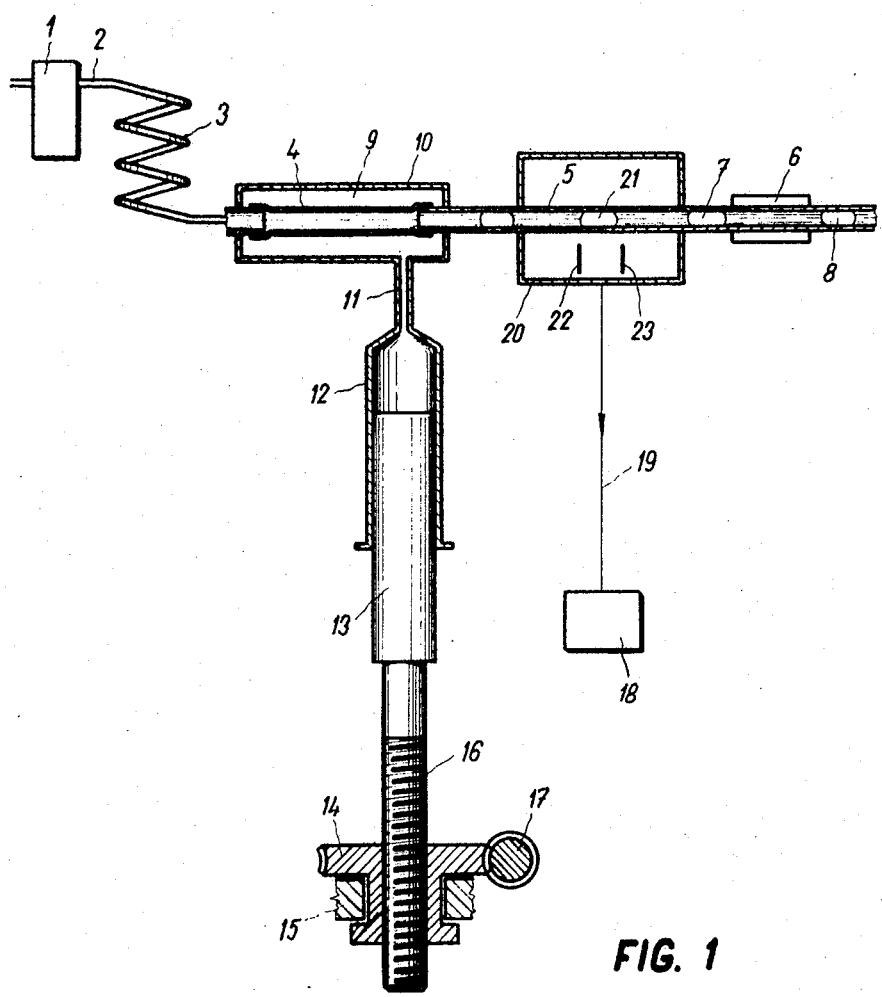
Figure 2:
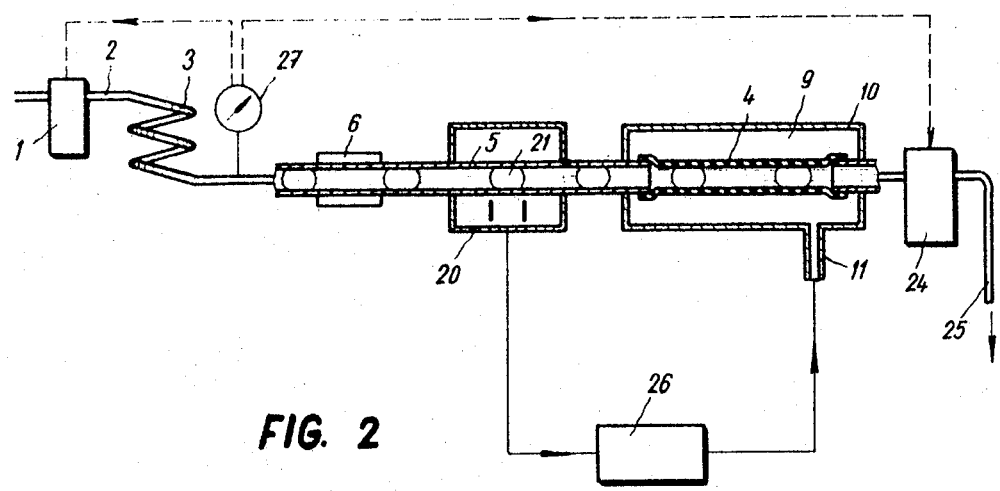
Figure 3:
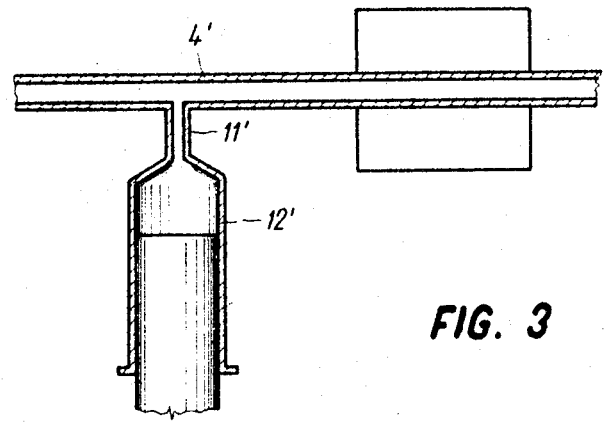
Figure 4:
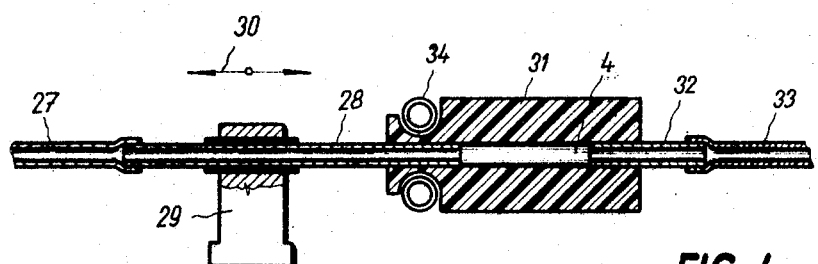
Figure 5:
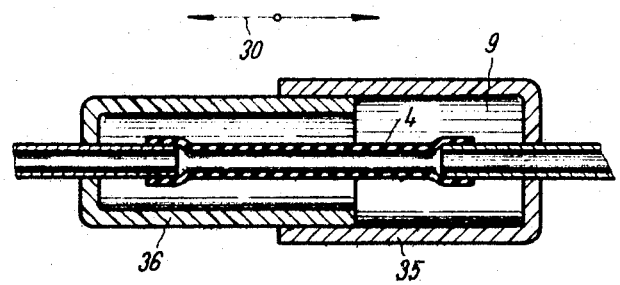
Figure 6:
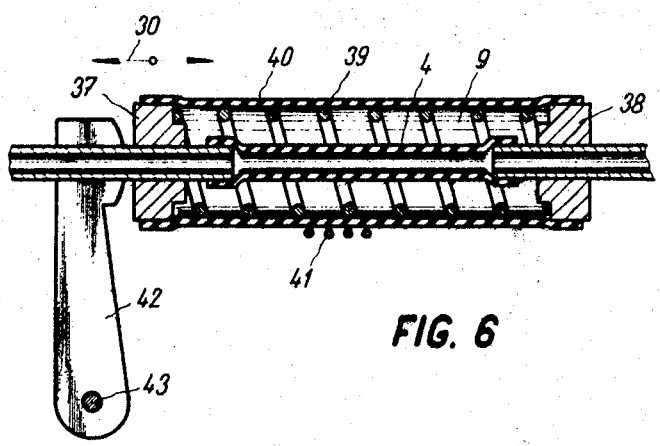

The said and other objects of my invention will be more fully understood from the following specification when read with the accompanying drawing in which each of FIGS. 1, 2 and 3 show schematically one embodiment of my apparatus, and each of FIGS. 4, 5 and 6 show schematically means within the apparatus to change the volume of the tubing carrying the flow of liquid.

The same reference numerals indicate the same or equivalent parts in all figures.

As shown in FIG. 1 my apparatus comprises a pumping aggregate 1 which in known manner delivers fluidal medium or media into the outlet piping 2 so that in the direction of movement the flow is subdivided into substantially equal sections separated by drops or by bubbles of an auxiliary liquid (for example of mercury) or gaseous medium; said drops or pistons act like separating pistons and will be so named hereinafter. The sequence of alternating flow sections and pistons pass through the capillary reactor 3 into the feed tubing leading into the measuring cell 6. Said feed tubing includes the elastic part 4, made for example from an elastic plastic material such as silicon rubber and, the continuing rigid tubing 5, in which the position of each passing flow section relative to said tubing is detected, and leads into the measuring cell 6 from where the flow passes into the open or into a space of constant pressure possibly of more than one atmosphere. The regulation of the position of said separating fluidal pistons relative to the measuring cell 6 in such manner that only one flow section but not the adjoining separating pistons such as 7, 8 are placed within the cell 6, is effected by changing the volume of the elastic tubing 4 through compressions or dilatations effected by varying amounts of pressure of a liquid pumped into the space 9 within a casing 10 tightly enclosing said elastic tubing 4. To this effect the space 9 is connected by a conduit 11 with a cylinder 12 which houses a reciprocable plunger 13. The plunger 13 is actuated by the worm wheel 14 which rests on the stationary bearing 15 and is axially engaged by the screw thread 16 arranged on the outer end of plunger 13. The worm wheel 14 is driven by the worm 17 which can be turned in either direction by reversible motor 18 over not shown customary transmission means. The working of motor 18 and thus of the pumping means 12, 13 effecting the compression or dilation of tubing 4 is governed by a known for example photoelectric sensing and controlling device 20 which emits impulses in the direction of arrow 19 to rotate said motor in one or the other direction whenever a piston such as 21 positionally evades permissible variations between the photoelectrically sensitive plate members 22, 23.

In the modified embodiment shown in FIG. 2 the positioning of the separating fluidal pistons in the terminal part of the feed tubing is determined mainly by the pumping means 24 which precisely effect the volumetric delivery of liquid from said terminal part without regard to the pressure into which the outlet tubing 25 leads. The elastic portion 4 of the feed tubing is in this embodiment located in the direction of flow behind the measuring cell 6 and the following sensing and controlling device 20 which governs the delivery of pressure fluid into the space 9 of chamber 10; the entity of the respective means 11 through 18 more fully shown in FIG. 1 is here symbolically indicated at 26.

If the content of the feed tubing is elastic, for example if gaseous pistons are used within the flow, or if the feed tubing or parts thereof are sufficiently resilient, or if elasticity is provided by auxiliary means, such as the manometer M, a displacement of the separating pistons relative to the measuring cell 6 and to part 5 of the feed tubing located within the sensing and controlling device 20 is caused by compression or dilation of the elastic part 4 of the tubing.

The manometer M can be used not only as a pressure indicating means and as an elasticity of the tubular content producing auxiliary member, but also as an emitter of signals influencing as schematically indicated by the dotted lines the volumetric performance of either the feeding pump 1 or the discharge pump 24 during a unit of time, thereby attaining a compensation of varying pumping velocities which otherwise would lead to an undesirable increase or decrease of pressure in the feed tubing between the pumps 1 and 24.

If gaseous separating pistons are used an at least partial regulation of pressure can, however, be achieved just by automatically decreasing with increasing pressure the delivery of the gaseous piston forming medium. Similarly, a regulation of pressure in reverse can be achieved by the action of the pumping means 24.

As schematically indicated in FIG. 3 the pump cylinder 12′ can be connected by the capillary conduit 11′ directly to the elastic portion 4′ of the feed tubing. This simplifies the embodiments shown in FIGS. 1 and 2 but has the disadvantage that part of the content of the capillary 4' is retained in conduit 11' and cylinder 12', or is forced therefrom back into the capillary 4' in another working phase. This may undesirably change the qualitative composition of the individual flow sections in the capillary 4' because the portion taken from one section is later delivered into another section. However, this disadvantage may in some cases be neglected being compensated by the simplified construction compared with that illustrated in FIGS. 1 and 2.

FIG. 4 shows schematically means to change the volume of a part of the feed tubing without changing its diameter. The part 27 of the tubing leads into the tubular needle 28 which is firmly held in the support 29. This support is reversibly movable in the direction of arrows 30 and pushes the needle 28 tightly into or draws the same from the boring 4 in the block member 31 made for example from Teflon. A circular spring member 34 may radially press the entrance end of block member 31 on the entering needle 28 for better tightening. At the other end of the block member 31 another needle 32 fitting the boring 4, leads into the continuation 33 of the tubing.

According to FIG. 5 the volume of the elastic portion 4 of the tubing can be changed by varying the volume of chamber 9 which is filled with a not compressible medium i.e. a liquid and is formed by the telescoping cup members 35, 36, operated as indicated by arrow 30 similarly as needle 28 and block member 31 of FIG. 3.

A similar effect can be achieved by the device shown in FIG. 6. The volume of chamber 9, housing the elastic part 4 of the feed tubing and filled with a not compressible medium, is changeable by displacing the frontal plug member 37 as indicated by arrow 30 relative to the stationary rear plug member 38. The chamber 9 is formed by an elastic tubular member 40, for example made of rubber, which with its ends tightly fits the plug members 37, 38 and is inwardly strengthened by a supporting helical spring 39; it may be also outwardly strengthened by the partly shown helical spring 41. This embodiment does not require a precise displacement of the plug member 37 and such displacement relative to plug member 38 can be effected by the lever 42 turnable on pin 43.

In the embodiments illustrated in FIGS. 5 and 6 a relatively small displacement of the members 36 and 37, respectively, will suffice to effect a relatively great deformation of the elastic part 4 of the feed tubing because in these embodiments the volume within said elastic part 4 of the feed tubing is exposed to the combined effects resulting from changes of the cross-sectional flow area and of the length of said elastic part 4.

While specific embodiments of my invention have been shown and described to illustrate the application of the principles of my invention, it will be understood that the same may be otherwise embodied without departing from such principles.

What I claim as my invention is:

1. An apparatus for feeding and measuring a fluidal medium substantially evenly divided into segments by bubbles of a liquid not mixable therewith comprising in combination a measuring cell receiving in succession one segment of said fluidal medium;
   a feed tube passing into and through said cell and having a volumetrically changeable portion within a casing;
   first pumping means causing the flow of said fluidal medium through said feed tube;
   a photoelectric sensing member testing and ascertaining the position of a bubble in the tube relative to the segment of fluidal medium in the measuring cell; and
   reversible second pumping means actuated by the sensing member when said bubble is not in said conforming relative position, said means adjusting the volume of said volumetrically changeable portion of the tube and thus the flow of fluid through the feed tube to place a fluidal segment into the cell in position for measurement.

2. An apparatus according to claim 1 wherein the feed tube in direction of the flow of the fluidal medium passes in succession the casing housing the volumetrically changeable portion of the tube, the sensing member and the measuring cell.

3. An apparatus according to claim 1 wherein the tube in direction of the flow of the fluidal medium passes the measuring cell, the sensing member and the casing, and enters suction pumping means.

4. An apparatus as defined in any of the claims 1, 2 or 3, comprising a reversible second pumping means feeding into said casing a non-compressible liquid to incite the resilient porton of the feed tube.

5. An apparatus as defined in any of the claims 1, 2 or 3, comprising a closed telescoping casing including the resilient portion of the feed tube, one of the telescoping members of the casing being actuated by the sensing member.

6. An apparatus as defined in any of the claims 1, 2 or 3, comprising an elastic tubular casing closed by a plug at each end; a resilient portion of the feed tube axially passing therethrough; and means axially compressing said elastic casing, said means actuated by the sensing member.

7. An apparatus as defined in any of the claims 1, 2 or 3, comprising a lengthwise interrupted feed tube having an entrance and an exit portion;
   a lengthwise movable mounted tubular needle attached with one end to the outlet of said entrance portion and a support therefor reversibly actuable by the sensing member;
   a block casing having an axial through boring, said boring receiving reciprocably at its entrance the other end portion of said needle and at its outlet the exit portion of the feed tube thereby leaving in-between a volumetrically changeable space for the fluid medium passing therethrough.

References Cited

UNITED STATES PATENTS

| | | | |
|---|---|---|---|
| 261,640 | 7/1882 | Straight | 251—5 |
| 2,458,027 | 1/1949 | Quist | 251—8 XR |
| 2,904,063 | 9/1959 | Wall et al. | 251—5 XR |
| 3,181,553 | 5/1965 | Liljendahl | 137—357 |
| 3,342,216 | 9/1967 | Griffin | 138—45 |
| 2,598,307 | 5/1952 | Rutgers | 137—566 XR |

HENRY T. KLINKSIEK, Primary Examiner

U.S. Cl. X.R.

137—566; 251—5